(12) United States Patent
Utsunomiya

(10) Patent No.: US 9,063,013 B2
(45) Date of Patent: Jun. 23, 2015

(54) INFRARED DETECTOR

(71) Applicant: Seiko Instruments Inc., Chiba-shi, Chiba (JP)

(72) Inventor: Fumiyasu Utsunomiya, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 14/470,586

(22) Filed: Aug. 27, 2014

(65) Prior Publication Data

US 2015/0060671 A1   Mar. 5, 2015

(30) Foreign Application Priority Data

Aug. 29, 2013   (JP) ................... 2013-178501

(51) Int. Cl.
*G01J 5/00* (2006.01)
*G01J 5/34* (2006.01)

(52) U.S. Cl.
CPC ........................................ *G01J 5/34* (2013.01)

(58) Field of Classification Search
CPC ............... G01J 5/34; G01J 5/20; G01N 21/35

USPC ........................................................ 250/338.3
See application file for complete search history.

(56) References Cited

U.S. PATENT DOCUMENTS

| | | | | |
|---|---|---|---|---|
| 5,654,550 A | * | 8/1997 | Nomura et al. | 250/338.3 |
| 5,684,303 A | * | 11/1997 | Kim et al. | 250/338.3 |
| 6,294,783 B1 | * | 9/2001 | Hayashi | 250/338.3 |

FOREIGN PATENT DOCUMENTS

JP           05-340807           12/1993

* cited by examiner

*Primary Examiner* — David Porta
*Assistant Examiner* — Abra Fein
(74) *Attorney, Agent, or Firm* — Brinks Gilson & Lione

(57) ABSTRACT

Provide is an infrared detector that has a simple configuration, has a high amplification factor, and is configured to operate at low voltage. An NMOS transistor at an output stage of a pyroelectric infrared detection element serves as a common source amplifier circuit in which a source is connected to GND via a resistor and a capacitor that are connected in parallel.

1 Claim, 2 Drawing Sheets

INFRARED DETECTOR

RELATED APPLICATIONS

This application claims priority under 35 U.S.C. §119 to Japanese Patent Application No. 2013-178501 filed on Aug. 29, 2013, the entire content of which is hereby incorporated by reference.

BACKGROUND OF THE INVENTION

1. Field of the Invention

The present invention relates to an infrared detector using a pyroelectric infrared detection element.

2. Description of the Related Art

FIG. 2 illustrates a circuit diagram of a related-art infrared detector using a pyroelectric infrared detection element.

The related-art infrared detector using a pyroelectric infrared detection element includes a pyroelectric infrared detection element 100, resistors 107 and 109, a constant voltage circuit 200, and an output terminal 110.

The pyroelectric infrared detection element 100 includes a pyroelectric element 101, an NMOS transistor 102, and a resistor 103.

The NMOS transistor 102 has a gate connected to the pyroelectric element 101 and the resistor 103, a drain connected to the output terminal 110 and to the constant voltage circuit 200 via the resistor 109, and a source connected to GND via the resistor 107. In other words, an output stage of the pyroelectric infrared detection element 100 serves as a common source amplifier circuit of the NMOS transistor 102.

The above-mentioned pyroelectric infrared detection element 100 operates as follows to detect infrared ray.

When infrared ray enters the pyroelectric infrared detection element 100, the resistor 103 converts electric charges generated in the pyroelectric element 101 into a voltage, and then a gate voltage of the NMOS transistor 102 increases. When the gate voltage increases, a drain current flows through the NMOS transistor 102 to vary a voltage at a node between the drain of the NMOS transistor 102 and the resistor 109, that is, a voltage at the output terminal 110. In this manner, because the NMOS transistor 102 serves as a common source amplifier circuit, by setting an appropriate resistance value of the resistor 109, the output stage of the pyroelectric infrared detection element 100 can obtain a desired amplification factor (see, for example, Japanese Patent Application Laid-open No. Hei 05-340807).

In the output stage of the above-mentioned infrared detector, the amplification factor is determined by the ratio of the resistance values of the resistor 107 and the resistor 109. In other words, in order to increase the amplification factor, it is necessary to increase the resistance value of the resistor 109 to be larger than that of the resistor 107. Accordingly, if the amplification factor is increased, a higher voltage is generated in the resistor 109, and hence it is necessary to increase a voltage to be output from the constant voltage circuit 200. In other words, the related-art infrared detector has a problem in that low voltage operation cannot be performed.

SUMMARY OF THE INVENTION

The present invention has been devised in order to solve the problem described above, and provides an infrared detector having a high amplification factor and configured to operate at low voltage.

In order to solve the related-art problem, an output stage of a pyroelectric infrared detection element is configured as a common source amplifier circuit in which a resistor and a capacitor are connected in parallel between a source of an NMOS transistor and GND.

According to the infrared detector of one embodiment of the present invention, the NMOS transistor at the output stage of the pyroelectric infrared detection element serves as a common source amplifier circuit in which the source is connected to GND via the resistor and the capacitor that are connected in parallel. Consequently, it is unnecessary to increase a resistance value of a resistor connected to a drain of the NMOS transistor, and hence there is an effect that the infrared detector can have a high amplification factor and perform low voltage operation.

DETAILED DESCRIPTION OF THE PREFERRED EMBODIMENT

Now, an embodiment of the present invention is described with reference to the accompanying drawing.

Figure 1:
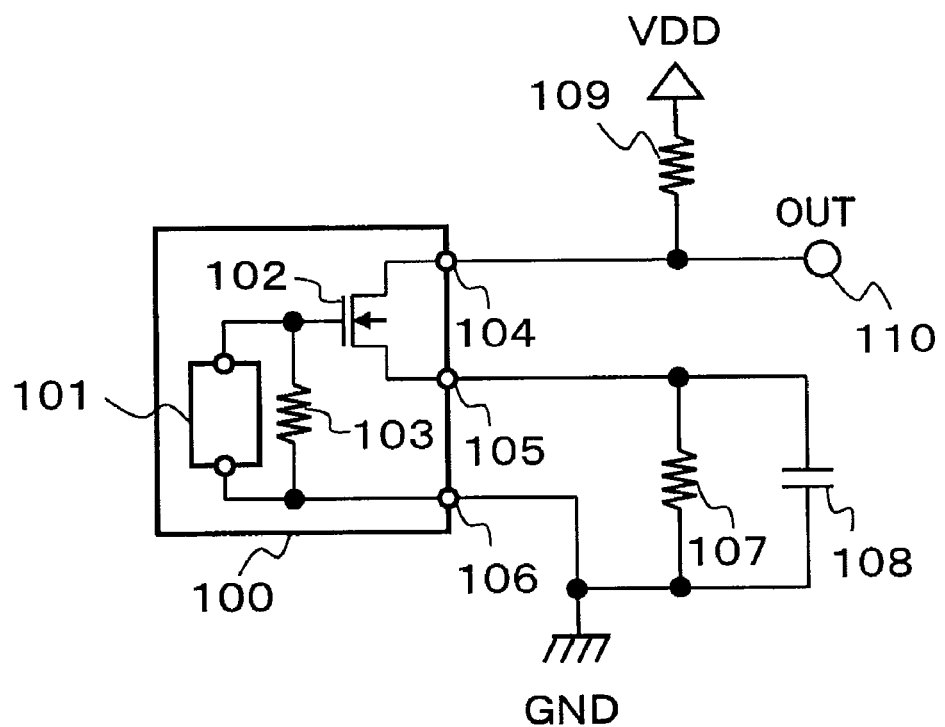
FIG. 1 is a circuit diagram of an infrared detector using a pyroelectric infrared detection element according to an embodiment of the present invention.
Figure 2:
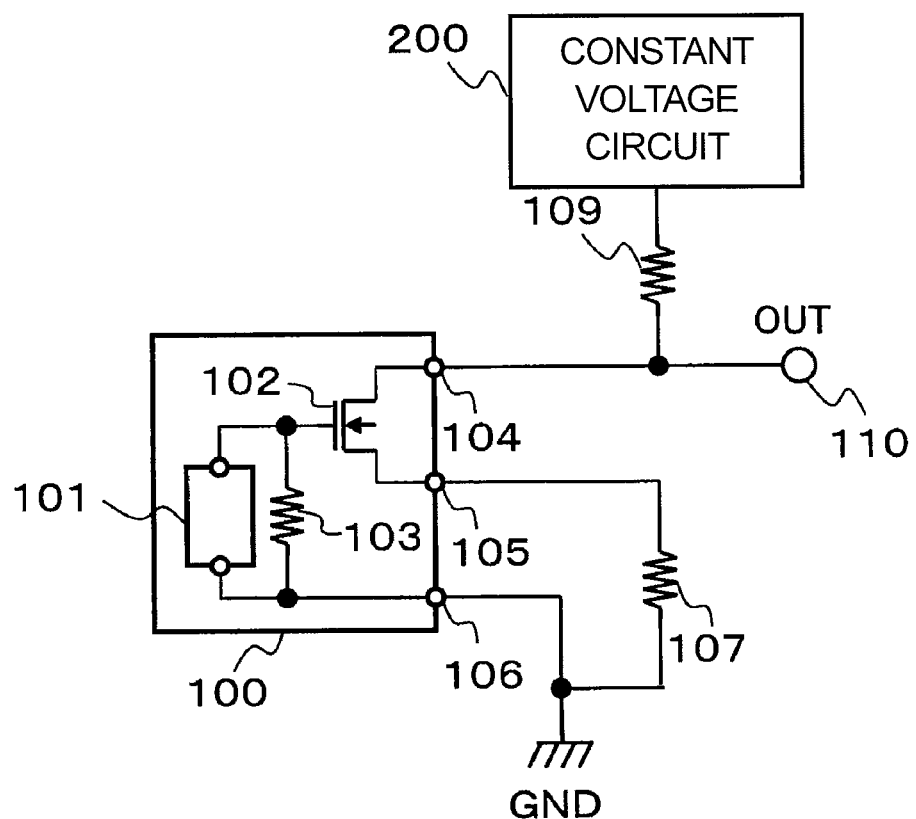
FIG. 2 is a circuit diagram of a related-art infrared detector using a pyroelectric infrared detection element.

FIG. 1 is a circuit diagram of an infrared detector using a pyroelectric infrared detection element according to this embodiment.

The infrared detector according to this embodiment includes a pyroelectric infrared detection element 100, resistors 107 and 109, a capacitor 108, and an output terminal 110.

The pyroelectric infrared detection element 100 includes a pyroelectric element 101, an NMOS transistor 102, a resistor 103, a drain terminal 104, a source terminal 105, and a ground terminal 106.

The NMOS transistor 102 has a gate connected to one terminal of the pyroelectric element 101 and one terminal of the resistor 103, a drain connected to the drain terminal 104, and a source connected to the source terminal 105. The other terminal of the pyroelectric element 101 and the other terminal of the resistor 103 are connected to the ground terminal 106. The drain terminal 104 is connected to the output terminal 110 and to VDD via the resistor 109. The source terminal 105 is connected to GND via the resistor 107 and the capacitor 108. In other words, an output stage of the pyroelectric infrared detection element 100 serves as a common source amplifier circuit of the NMOS transistor 102.

The above-mentioned infrared detector operates as follows to detect infrared ray.

When infrared ray enters the pyroelectric infrared detection element 100, the resistor 103 converts electric charges generated in the pyroelectric element 101 into a voltage, and then a gate voltage of the NMOS transistor 102 increases. Because the NMOS transistor 102 has high drivability, when the gate voltage increases, a source voltage thereof also intends to increase. In this case, because the capacitor 108 is connected to the source terminal 105 in parallel to the resistor 107, the source voltage of the NMOS transistor 102 is maintained at a voltage before the increase in gate voltage. As a result, a gate-source voltage of the NMOS transistor 102 increases, and a larger amount of drain current of the NMOS transistor 102 flows than without the capacitor 108. The increased amount of the drain current is a value determined by multiplying an increased amount of the gate voltage of the NMOS transistor 102 by a K value of the NMOS transistor 102. Because this drain current flows through the resistor 109, an amplification factor of the output stage of the infrared detector can be increased without the need of increasing a resistance value of the resistor 109 to be larger than that of the resistor 107.

As described above, in the infrared detector using the pyroelectric infrared detection element according to this embodiment, the NMOS transistor serves as a common source amplifier circuit in which the source is connected to GND via the resistor and the capacitor that are connected in parallel. Thus, the amplification factor of the output stage of the infrared detector can be increased without the need of increasing the resistance value of the resistor 109 to be larger than that of the resistor 107. Consequently, the infrared detector can operate at a lower voltage than in the related art.

Note that, the infrared detector according to this embodiment is configured to apply a power supply voltage (VDD) to the drain terminal of the pyroelectric infrared detection element via the resistor, but may be configured to apply a constant voltage output from a constant voltage circuit.

What is claimed is:

1. An infrared detector for detecting a change in incident amount of infrared ray, comprising:

a pyroelectric infrared detection element, including:
- a transistor comprising a drain terminal and a source terminal;
- wherein the drain terminal is connected to an output terminal of the infrared detector; and
- a ground terminal connected to a ground;

a first resistor connected between the drain terminal and a power supply terminal;

a second resistor connected between the source terminal and the ground; and a capacitor connected between the source terminal and the ground and connected in parallel to the second resistor, wherein as a gate voltage of the transistor increases, the capacitor is configured to maintain a source voltage not to increase with the gate voltage; and wherein an increased amount of a drain current flows through the first resistor and the increased amount of the drain current corresponds to a value determined by multiplying an increased amount of a gate voltage of the transistor by a K value of the transistor.

* * * * *